United States Patent [19]
Wenhart

[11] Patent Number: 5,222,661
[45] Date of Patent: Jun. 29, 1993

[54] VEHICLE INTERIOR AIR CONDITIONING DEVICE

[75] Inventor: Christian Wenhart, Munich, Fed. Rep. of Germany

[73] Assignee: Webasto Karosseriesysteme GmbH, Stockdorf, Fed. Rep. of Germany

[21] Appl. No.: 836,969

[22] Filed: Feb. 19, 1992

[30] Foreign Application Priority Data

Feb. 20, 1991 [DE] Fed. Rep. of Germany ....... 4105143

[51] Int. Cl.⁵ .............................................. B60H 1/03
[52] U.S. Cl. .................. 236/49.3; 237/2 A; 237/12.3 C; 454/75; 454/129
[58] Field of Search .......... 237/2 A, 12.3 C; 165/16; 454/128, 129, 75; 98/2.14; 236/49.3

[56] References Cited

U.S. PATENT DOCUMENTS

| | | | |
|---|---|---|---|
| 3,362,637 | 1/1968 | Cornell | 237/2 A |
| 3,943,726 | 3/1976 | Miller | 454/900 X |
| 4,773,588 | 9/1988 | Okada | 237/2 A |
| 5,054,686 | 10/1991 | Chuang | 236/49.3 |

Primary Examiner—William E. Tapolcai
Attorney, Agent, or Firm—Sixbey, Friedman, Leedom & Ferguson

[57] ABSTRACT

An interior climate control system in which a vehicle fan of the vehicle's own ventilation device, an openable and closable vehicle opening, such as a roof opening or a window opening, and a heater that can be operated independently of the engine are linked by an operating control circuit into a functional unit so that, when a predetermined, upper temperature limit is exceeded, a control circuit allocated to the operating devices for the openable and closable vehicle opening is controlled and activated, and so that, when the temperature falls below a predetermined, lower limit, the engine-independent heater is controlled and started. A pre-air conditioning operation or a preheating operation in the interior climate control system can be achieved by a remote control device and/or by a preadjustable timer device by the operating control circuit.

18 Claims, 1 Drawing Sheet

| State Table | | | | | | | |
|---|---|---|---|---|---|---|---|
| Status | Interior Sensor 10 | Humidity Sensor 15 | Roof Position 1 | Main Relay 2 | Fan Relay 3 | Heat Relay 4 | Function |
| ON | $T>T_u$ | YES | C | I | I | O | Cooling |
| ON | $T<T_l$ | YES | C | I | O | I | Heating |
| ON | $T_l<T<T_u$ | YES | C | O | O | O | Off |
| ON | $T>T_u$ | NO | O | I | I | O | Cooling |
| ON | $T<T_l$ | NO | C | I | O | I | Heating |
| ON | $T_l<T<T_u$ | NO | O | O | O | O | Off |
| OFF | — | — | — | — | — | — | O |

$T_u$ = Upper Temp. Limit
$T_l$ = Lower Temp. Limit
C = Closed   O = Open

VEHICLE INTERIOR AIR CONDITIONING DEVICE

BACKGROUND OF THE INVENTION

The invention relates to a vehicle interior air conditioning device that exhibits a vehicle fan, for example, the vehicle's own ventilation device, an operating device for an openable and closable vehicle opening (roof opening, window opening, etc.) which has a control circuit that triggers the operating device when a predetermined temperature threshold value inside the vehicle is exceeded and when outside humidity is not detected by an outside humidity sensor, and a heater that can be operated independently of the engine and that has a fan.

An automatic ventilation system for a closed space, such as a vehicle interior, is known from U.S. Pat. No. 4,852,469, in which one or more ventilation devices are provided. Depending on an interior temperature sensor and an outside humidity sensor, such as a rain sensor, the ventilation devices, such as a window, sliding roof or convertible top, are triggered by a control device so that, when exceeding of a predetermined temperature threshold value inside the vehicle is detected with the help of the interior temperature sensor, and when it is determined by the outside humidity sensor that no rain is falling, the ventilation devices are triggered and activated, and, for example, the sliding roof and/or the window are opened. This prior art thus concerns itself exclusively with ventilation of the vehicle interior.

Further, there are heaters that can be operated independently of the engine, that can be installed in a vehicle, and that have their own fan and control device, by which the vehicle interior, if required, can be heated independently of the operation of the internal combustion engine of the vehicle. Such heaters that can be operated independently of the engine represent self-contained units that are used additionally or exclusively for heating purposes if required, for instance when the vehicle engine is not in operation, or didn't yet warm up the cooling liquid sufficiently.

Previously, vehicle ventilation systems and heaters that can be operated independently of the engine were operated by separate controls that had to be activated manually by an operator. Although, control systems for heaters (see, for example, U.S. Pat. No. 4,436,064) and ventilation systems (see, commonly owned co-pending U.S. patent application Ser. No. 07/729,380) are known by which operation can be initiated in dependence on ambient conditions and/or time parameters, engine-independent heaters and ventilators have not been integrated into a vehicle interior climate control system that is not substantially dependent on manual actions of an operator.

SUMMARY OF THE INVENTION

The primary object of the present invention is to provide a vehicle interior air conditioning device that provides improved operating convenience and that relieves the operator, to a great extent, of manual operating actions.

According to the invention, this object is achieved by a climate control system for a vehicle interior that has:
- a vehicle fan,
- an operating device for an openable and closable vehicle opening (roof opening, window opening, etc.) and to which a control circuit is connected that triggers the operating device when a predetermined temperature threshold value inside the vehicle is exceeded and when outside humidity is not detected by an outside humidity sensor, and
- a heater that can be operated independently of the engine is improved in that an operating control circuit is provided that triggers the control circuit of the operating device for the openable and closable vehicle opening when a predetermined, upper temperature limit is exceeded and that triggers the engine-independent heater when the temperature falls below a predetermined, lower temperature limit.

The vehicle interior climate control system according to the invention thus links, by an operating control circuit and a predetermined temperature dependence, the ventilation systems of the vehicle and the heater that can be operated independently of the engine into a combined functional unit that works independently, to a great extent, of manual operating actions of an operator. Thus, with the invention, the ventilation systems and heating systems of a vehicle are functionally coupled into one combination, achieving easier operation and better user friendliness.

According to a preferred embodiment of the invention, when the predetermined upper temperature limit is exceeded, the operating control circuit activates the fan of an engine-independent heater having a separate fan. Because of this design, for increased cooling of the vehicle interior, the fan of the engine-independent heater can also be used by the operating control circuit of the climate control system. Such a method of operation makes it possible that, also when the internal combustion engine of the vehicle is stopped, a forced cooling of the vehicle interior, supported by the fan of the engine-independent heater can be achieved.

Preferably, the operating control circuit can be activated by a preadjustable timer device, such as a preselect clock. Because of this operational linkage by the operating control circuit, the preselect devices for a heater that can be operated independently of the engine, for ventilation or cooling purposes, can be used in the interior climate control system according to the invention.

A preferred embodiment of the interior climate control system is further distinguished in that the operating control circuit can be activated by a remote control device. In this way, the interior climate control system according to the invention can be started by remote control.

The operating control circuit, with respect to triggering the ventilation system and/or the heater that can be operated independently of the engine, can also take the outside temperature into account. For this purpose, preferably, an outside temperature sensor is coupled operationally to the operating control circuit.

In a preferred embodiment, the operating control circuit contains switching relays that are allocated to the respective devices of the interior climate control system for triggering operation. Alternately, the operating control circuit can also be designed in the form of an integrated circuit component, such as a microchip or the like.

These and other objects, features and advantages of the present invention will become apparent from the following detailed description when it is viewed in conjunction with the accompanying drawings.

DETAILED DESCRIPTION OF THE PREFERRED EMBODIMENT

Figures 1, 2:
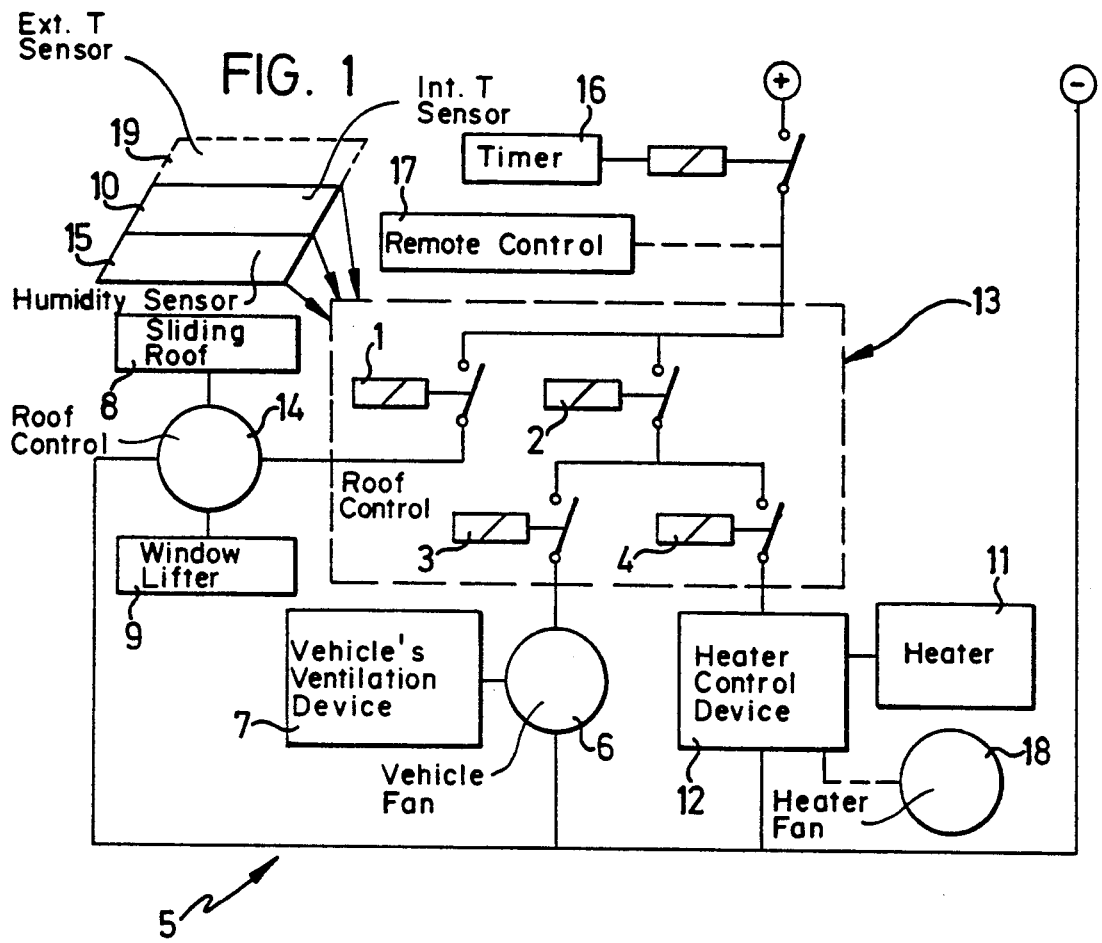
FIG. 1 is a diagrammatic block diagram of a climate control system for a vehicle interior with an associated operating control circuit.
FIG. 2 is an example of a state table to explain the controllable operating states of the climate control system for a vehicle interior.

In the example shown in FIG. 1, a vehicle fan 6 of the vehicle's own ventilation device 7, an openable and closable roof opening, such as a sliding roof 8, a sliding-lifting roof or the like and a window opening that can be opened and closed by a window lifter 9 are incorporated into an interior climate control system for ventilation purposes designated overall by 5. For heating purposes, interior climate control system 5 comprises a heater 11 that can be operated independently of the engine and that can be operated by control device 12.

These above-mentioned devices are linked functionally by an operating control circuit designated 13, as a whole. In the example shown, operating control circuit 13 is made as a relay arrangement and comprises a relay 1 for an actuator 14 that may be, for example, an electric motor by which sliding roof 8 and/or window lifter 9 of the vehicle can be operated. A main relay 2 is further provided that makes possible the activation of operating control circuit 13 by a preadjustable timer device 16, such as a preselect clock and/or a remote control device 17. Operating control circuit 13 further includes a relay 3 for vehicle fan 6 of the vehicle's own ventilation device 7. Finally, a relay 4 is also provided that is connected to the control device 12 of the engine-independent heater 11. In a heater 11 that has a fan 18, the fan is controlled by relay 4.

In operating control circuit 13, relays 1, 3 and 4 form the outputs, while an interior temperature sensor 10 and an outside humidity sensor 15, such as a rain sensor, are provided as inputs for operating control circuit 13. As indicated in dashed lines in FIG. 1, an outside temperature sensor 19 can optionally be provided as another input for operating control circuit 13.

From the state table according to FIG. 2, interior climate control system 5 with operating control circuit 13 effects, at a minimum, the methods of functioning described below. In this regard, it is noted that the functioning of the operating control circuit 13 reflected in the table of FIG. 2 can be produced in various ways. For example, the control circuit 13, particularly when in microchip form, can include such a table as a "look-up" table in a memory storage location that is accessed periodically on the basis of the outputs of the sensors being monitored by the control circuit 13. Alternatively, these functions can be achieved through use of a logic circuit using techniques and components, such as "and," "or" and/or "nor" gates connected to the sensor outputs. Since the manners in which the disclosed results can be achieved are well known in the control art, the specifics of such control components and techniques, themselves, are not part of this invention and need not be described in greater detail.

An upper temperature limit $T_u$ and a lower temperature limit $T_l$ are predetermined for interior temperature sensor 10. When interior temperature T is higher than upper temperature limit $T_u$, then operating control circuit 13 checks whether or not outside humidity sensor 15 is supplying a signal. If outside humidity sensor 15 is supplying a signal indicating rain, then operating control circuit 13, activated by main relay 2, causes only vehicle fan 16 of the vehicle's own ventilation device 7 to be switched on by relay 3. Sliding roof 8 remains closed or is closed and the window opening remains closed or is at least partly closed by window lifter 9. As shown with dashed lines, in heater 11 that utilizes a separate fan 18, optionally, this separate fan can also be switched on by the relay 4 for control device 12 of engine-independent heater 11 to support interior cooling. If, on the other hand, the outside humidity sensor 15 does not sense rain, sliding roof 8 and window lifter 9 are also operated by operating control circuit 13, with the help of associated actuator 14 by relay 1 (of course, a manual override for this function is provided for those cases where the vehicle operator does not wish, for example, the windows to be opened to the extent automatically produced). Thus, interior climate control system 5 performs an effective cooling of the vehicle interior using the devices of the ventilation system, such as sliding roof 8, window lifter 9, vehicle fan 6 of the vehicle's own ventilation device 7, and optionally, by fan 18 of the engine-independent heater 11.

When interior temperature T is less than predetermined, lower temperature limit $T_l$, operating control circuit 13 activates, independently of the signal from outside humidity sensor 15, by relay 4, control device 12 of engine-independent heater 11. As a result, the engine-independent heater 11 is started to heat the vehicle interior.

When predetermined lower temperature limit $T_l$ is less than vehicle interior temperature T and the temperature T, in turn, is less than the predetermined, upper temperature limit $T_u$, operating control circuit 13 is shut off.

With the help of preadjustable timer device 16, such as a preselect clock, operating control circuit 13 can be activated at a desired time in each case with the setting of a preselected time, such as 12, 24, 48 hours or less. Depending on the sensor inputs, operating control circuit 13 then triggers the above functions illustrated by the state table according to FIG. 2. However, as a security measure, to prevent theft of an unattended vehicle or the contents thereof, an engine or ignition sensor may be provided which, if it detects that the engine or ignition switch is off when the operating control circuit is activated at the desired time, inhibits or limits opening of the windows and/or sliding or sliding/lifting roof.

Alternately or additionally, operating control circuit 13 can be activated remotely by remote control device 17, such as a transmitting and receiving device. After activation, operating control circuit 13 then triggers the functions illustrated, for example, in the state table according to FIG. 2.

Optionally, the triggering of the functions of operating control circuit 13 can also be caused depending on another input, for example, from an outside temperature sensor 19. In this way, e.g., in winter, if the vehicle interior is warmed due to the greenhouse effect, the windows will not be opened to the cold outside environment if the temperature sensed by the outside temperature sensor 19 is below a preset temperature.

With the help of remote control device 17 and/or preadjustable timer device 16, interior climate control system 5 according to the invention, thus, makes possible a preheating operation for warming up the vehicle interior or a pre-air conditioning operation of the vehicle interior in which the vehicle interior is cooled depending on the temperature conditions present.

Of course the invention is not limited to the above-described details, and numerous changes and modifications are possible that will be apparent to one skilled in the art from the foregoing, and can be implemented without going beyond the scope of the invention, which should be viewed as encompassing the full scope of the appended claims, and according to which, by an operating control circuit 13, a functional linking of various devices used for ventilation and for heating purposes of a vehicle interior is achieved. In this way, the vehicle interior temperatures can be adapted to the respectively desired conditions, taking the ambient conditions into account, so that the travel comfort is considerably improved. Further, interior climate control system 5 is made so that a user-friendly operation results from the fact that operating control circuit 13, essentially without manual operation of the devices of the vehicle ventilation system and of the vehicle heating system, activates the respective devices automatically taking predetermined conditions into account controls.

It may be understood, that, if automatic operation of control circuit 13 is not desired and thus has not been activated according to one of the predescribed methods, each of the components (window lifter 9, heater control device 12, roof control 14 and fans 6, 18) may be operated manually, which is shown within the bottom line of state table (FIG. 2).

I claim:

1. Vehicle interior climate control system comprising:
   A) a vehicle fan;
   B) at least one operating device drivingly connected to at least one openable and closable vehicle opening for opening and closing said at least one vehicle opening;
   C) an operating control circuit connected to the at least one operating device, to a vehicle interior temperature sensor and to an outside humidity sensor, said control circuit triggering at least one said operating device when both a predetermined temperature threshold value inside the vehicle is exceeded and when the outside humidity sensed by an outside humidity sensor is below a predetermined value; and
   D) a engine-independent heater that is operable independently of a vehicle internal combustion engine;
   wherein said operating control circuit is also connected to said vehicle fan and triggers vehicle interior ventilation by actuation of at least one of both said vehicle fan and said operating device when the temperature sensed by the vehicle interior temperature sensor exceeds a predetermined upper temperature limit, and triggers operation of said engine-independent heater when the temperature sensed by said vehicle interior temperature sensor falls below a predetermined lower limit.

2. Vehicle interior climate control system according to claim 1, wherein the engine-independent heater has a separate fan; and wherein said operating control circuit is connected to said fan in manner activating the fan when said predetermined upper temperature limit is exceeded to produce said interior ventilation.

3. Vehicle interior climate control system according to claim 2, wherein a preadjustable timer device is connected to said operating control circuit for activating operation.

4. Vehicle interior climate control system according to claim 1, wherein a preadjustable timer device is connected to said operating control circuit for activating operation.

5. Vehicle interior climate control system according to claim 1, wherein a remote control device is provided for activating the operating control circuit.

6. Vehicle interior climate control system according to claim 2, wherein an outside temperature sensor is provided, said operating control circuit operating in response to the output thereof in addition to the temperature sensed by said inside temperature sensor.

7. Vehicle interior climate control system according to claim 1, wherein an outside temperature sensor is provided, said operating control circuit operating in response to the output thereof in addition to the temperature sensed by said inside temperature sensor.

8. Vehicle interior climate control system 1, wherein operating control circuit comprises a plurality of relays.

9. Vehicle interior climate control system 8, wherein said plurality of relays comprise a first relay for controlling activation of said at least one operating device, and a second relay for triggering operation of said heater.

10. Vehicle interior climate control system 9, wherein said plurality of relays comprise a third relay for controlling activation of a fan of said heater and a main relay for controlling operation of said second and third relays.

11. Vehicle interior climate control system according to claim 10, wherein a preadjustable timer device is connected to said operating control circuit for activating operation of said main relay.

12. Vehicle interior climate control system according to claim 10, wherein a remote control device is provided for activating the operation of said main relay.

13. Vehicle interior climate control system according to claim 1, wherein said at least one operating device comprises a window operating mechanism.

14. Vehicle interior climate control system according to claim 1, wherein said at least one operating device comprises a roof operating mechanism.

15. Vehicle interior climate control system according to claim 1, wherein said at least one operating device comprises a window operating mechanism and a roof operating mechanism.

16. Vehicle interior climate control system comprising:
   A) a vehicle fan;
   B) at least one operating device drivingly connected to at least one openable and closable vehicle opening for opening and closing said at least one vehicle opening;
   C) an operating control circuit connected to the at least one operating device, to a vehicle interior temperature sensor and to an outside humidity sensor, said control circuit triggering at least one said operating device when both a predetermined temperature threshold value inside the vehicle is exceeded and when the outside humidity sensed by an outside humidity sensor is below a predetermined value; and
   D) a engine-independent heater that is operable independently of a vehicle internal combustion engine;
   wherein said operating control circuit triggers vehicle interior ventilation when the temperature sensed by the vehicle interior temperature sensor exceeds a predetermined upper temperature limit, and triggers operation of said engine-independent heater when the temperature sensed by said vehicle interior temperature sensor falls below a predetermined lower limit; wherein the engine-independent heater has a separate fan; and wherein said operating control circuit is connected to said fan in manner activating the fan when said predetermined upper temperature limit is exceeded to produce said interior ventilation.

17. Vehicle interior climate control system according to claim 16, wherein a preadjustable timer device is connected to said operating control circuit for activating operation.

18. Vehicle interior climate control system according to claim 16, wherein an outside temperature sensor is provided, said operating control circuit operating in response to the output thereof in addition to the temperature sensed by said inside temperature sensor.

* * * * *